United States Patent [19]

Lin

[11] Patent Number: 4,823,080

[45] Date of Patent: Apr. 18, 1989

[54] TOUCHLESS (PHOTO TYPE) AND CONTACT DIGITAL DUAL PURPOSE TACHOMETER

[76] Inventor: Dong-Chang Lin, Fl. 7, No. 15, Lane 144, Minchuan West Road, Taipei, Taiwan

[21] Appl. No.: 66,708

[22] Filed: Jun. 26, 1987

[51] Int. Cl.⁴ ............................ G01P 3/36; G01P 3/02
[52] U.S. Cl. ....................................... 324/175; 73/529; 324/160; 324/166; 340/727
[58] Field of Search ................ 324/160, 161, 166, 172, 324/175; 73/408, 529; 340/716, 755, 727

[56] References Cited

U.S. PATENT DOCUMENTS

| | | | |
|---|---|---|---|
| 4,000,465 | 12/1976 | Sugiyama | 324/166 |
| 4,225,929 | 9/1980 | Ikeda | 340/727 X |
| 4,554,638 | 11/1985 | Iida | 340/727 X |

Primary Examiner—Reinhard J. Eisenzopf
Assistant Examiner—Robert W. Mueller
Attorney, Agent, or Firm—Morton J. Rosenberg

[57] ABSTRACT

This invention is directed to a combination touchless (photo type) and contact type tachometer having a digital display for measuring high, medium and low rotating and surface speeds. Mechanical rotation may be detected by a photo emitting-receiving sensor on the left-hand end of the device or by the contact transmitter located on the right-hand side. The received signal is amplified by an amplifier circuit and regulated by a regulator circuit. Subsequently the data is processed by a standard micro-processor IC circuit, for performing calculations, unit conversion and display decoding. The speed and other information are precisely displayed by a shiftable and reversible, rotatable 180°, digital displaying unit to achieve the advantages of an easy to read, precise, economical and effective tachometer.

4 Claims, 6 Drawing Sheets

TOUCHLESS (PHOTO TYPE) AND CONTACT DIGITAL DUAL PURPOSE TACHOMETER

BACKGROUND OF THE INVENTION

The conventional types of digital tachometers can be classified into two categories, the digital display touchless (photo) type tachometers and the digital display contact type tachometers. The digital display touchless tachometer is suitable for medium and high speed measurement as well as for general purpose speed measurement. Because the speed detecting is accomplished by optical methods, there is no loading effect on this type of tachometer, and therefore provides the advantages of being more precise and safe. But due to the characteristics of the electronic circuit structure, it is not usable for surface speed measurement and very low speed measurement. On the other hand, the digital display contact tachometer is particularly suitable for low speed and surface speed measurement. However, the contact measurement is subject to extra contact load that will slightly decrease the precision of measurement and it is not suitable for measuring the high speed or the speed of an object which is impractical to make contact with. Therefore, the user has to obtain both of these two types of tachometers to accomodate the different measuring applications, thus causing extra expense and operational inconvenience.

In order to eliminate the above shortcomings, a new multipurpose combined touchless and contact type tachometer is provided. The special features of the inventive concept are to combine the touchless and contact type tachometer signal receivers into a single complete unit, and provide a main electronic circuit which is common to both systems. Since only a few extra parts are required to assemble the two different systems into a single complete unit, its costs are as low as those of the single purpose type tachometers, and the users are not required to purchase two types of tachometers. This provides a more convenient and economical system. Also because one end of this dual purpose tachometer is used for the touchless tachometer and the other end for the contact tachometer, a specially designed "display decoding circuit" is incorporated into this tachometer for rotating the display 180°.

SUMMARY OF THE INVENTION

This invention is directed to a combined touchless (phot type) and contact type tachometer having a digital display. The tachometer is equipped with both a contact type tachometer transmitter and photo type tachometer sensor. The tachometer is arranged with the photo sensor on one end and the direct contact type transmitter on the opposing end. Common to both sensing systems is an electronic processing circuit which comprises an amplifier circuit, a regulator circuit and a standard micro-processor circuit for calculation, unit conversion and decoding. Whenever the photosensor or contact type transmitter is operated respectively, the reading displayed on the shiftable and rotatable display unit is always in a positive sense, the displayed characters properly facing the operator.

DESCRIPTION OF THE PREFERRED EMBODIMENTS

Figure 1:
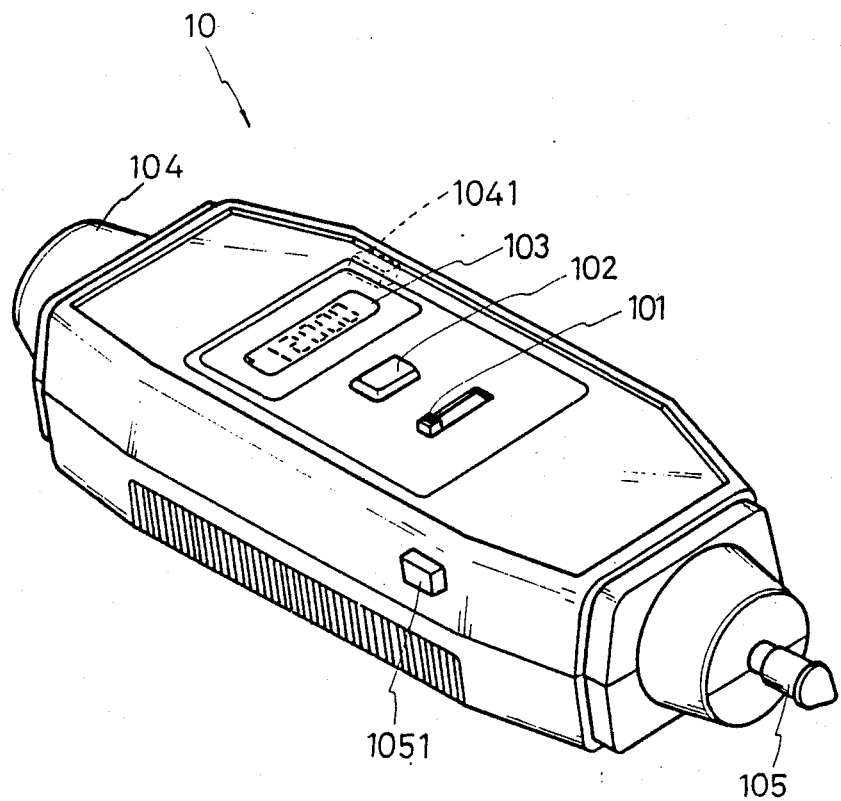
FIG. 1 is a perspective view of the combined touchless and contact type tachometer.
Figure 2:
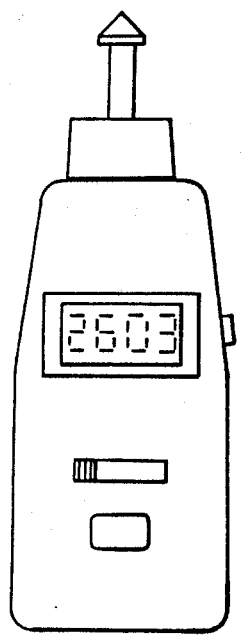
FIG. 2 is the prior art contact type digital display tachometer.
Figure 3:
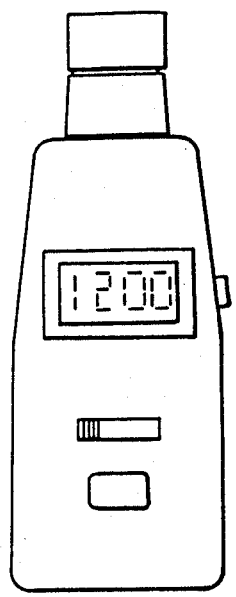
FIG. 3 is the prior art type touchless digital display tachometer.

Referring to FIG. 1, there is shown the outward appearance of the combined touchless and contact digital tachometer. It comprises a main casing 10. Located on the right-hand side of main casing 10 is a contact transmitter 105, and on the left-hand side is a photo receiving-emitting sensor 104. On the right-front side of case 10 is a switch 1051, used to control contact transmitter 105. Located on the left-rear side is a switch 1041 used to control the photoelectric sensor 104, and on the upper portion of the main casing 10 is digital display indicator 103, memory switch 102 and units selecting switch 101.

When using the touchless tachometer, a reflecting paper is firstly adhered to the object being tested. Then the photo-sensor is directed toward the reflecting sticker on the now rotating object and the switch 1041 is depressed to cause a light beam to be emitted by the tachometer. This light beam is reflected by the reflecting sticker and is received by the photo-receiver portion of sensor 104, responsively a speed signal is generated by the photo-sensor 104. Subsequent to the calculation process, the results are displayed by the digital display indicator 103.

When a contact measurement is to be made, the contact transmitter 105 is brought into direct contact with the moving object being tested. By depressing the switch 1051, the pulse signal generated by the rotating contact transmitter 105 is coupled to the internal processing circuit. The final results are then displayed by digital display indicator 103. The same procedure is used for surface speed measurements, only the conical shaped contact transmitter tip is replaced by a surface speed test wheel.

As illustrated in FIG. 1, the upper portion of case 10 is provided with a memory switch 102. When the tachometer 10 is disconnected from the measuring object, the reading previously displayed by indicator 103 is turned off immediately. But, the numerical data is stored in the memory of microcomputer 5, shown in FIG. 5, and can be stored within its memory for a period of approximately ten minutes. Within this time period, the memory switch 103 can be operated to redisplay the recorded speed measurement on the indicator 103.

A units selection switch 101 is also located on the upper portion of case 10. Different measurement units can be selected with switch 101 to meet the user's requirement. The switch function includes the selection or contact type tachometer, and the selection of surface speed units (British or metric) such as M/MIN, Ft/MIN, and Inch/MIN, etc. The desired units can be converted to one of the other units by microprocessor IC circuit 5, which provides great convenience to the user.

Figure 4:
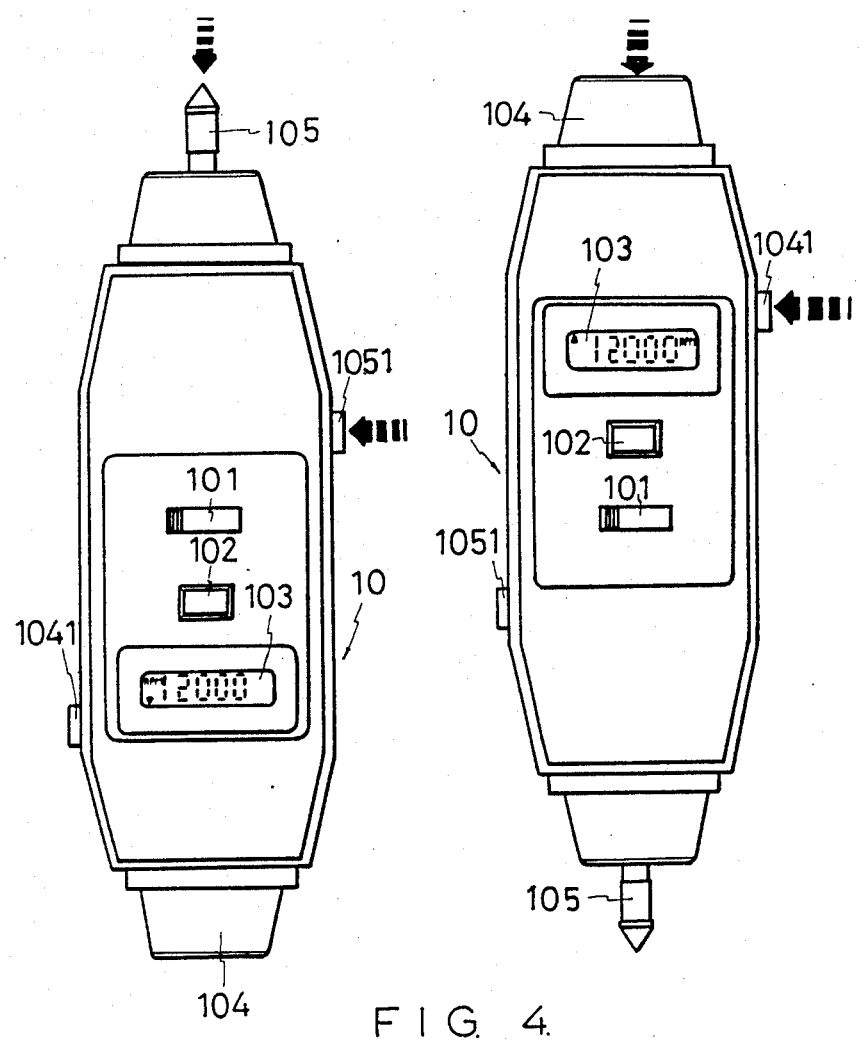
FIG. 4 is the features of testing operation of this invention.

As shown on FIG. 1 and FIG. 4, the digital display indicator 103 can be constructed with LED type or LCD type indicators. Since this indicating system is common for the two sensors located on opposing ends of the tachometer casing 10 it is desirable to be able to read the display from either direction. Therefore a decoder for reversing and shifting, rotating 180°, the numerical display is incorporated into the tachometer. Thus, whenever either the touchless tachometer 104 or contact tachometer 105 is selected for use, the numerical display on indicator 103 is rotated to always provide non-inverted characters with respect to the operator, and is one of the special features of this system.

Figure 5:
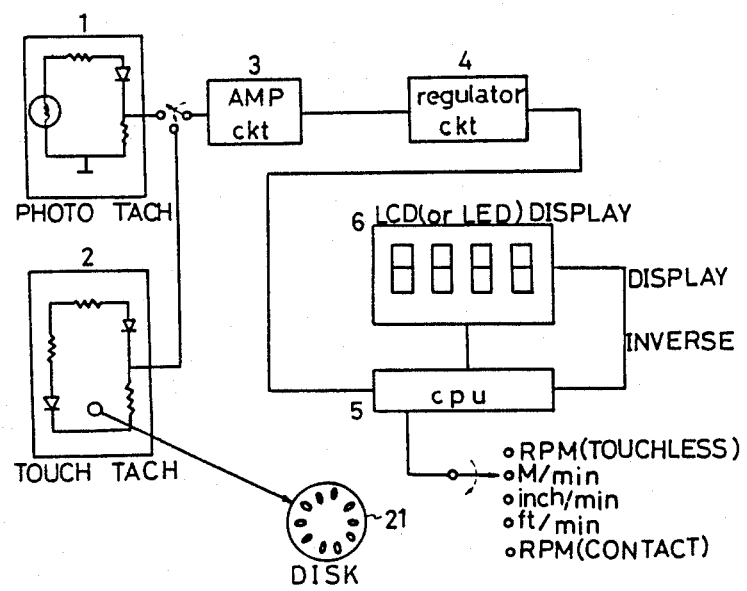
FIG. 5 is the circuit block diagram of this invention.

As shown in FIG. 5, the electric circuit of this invention comprises a photo-light sensor having a light emitting source and a light receiving sensor structure 1, a contact transmitter 2, a signal amplifier circuit 3, a regulator circuit 4, a standard microprocessor IC circuit 5 (for calculation, memory, decoding and indicator driving functions) and numerical display indicator 6. A pulse signal is generated by photo-sensor circuit 1 or 2, responsive to rotation or movement of the object being measured and coupled to the amplifier circuit 3 for amplification. The pulse data is then coupled to the regulator circuit 4 for regulating treatment and distortion compensation. The regulated pulse signal is fed to the micro-processor IC circuit 5, where the period of the pulse signal is calculated. From above data the numerical value of RPM is obtained and displayed on the indicator 6. Providing very convenient operation and easy to read display output.

Figure 6:
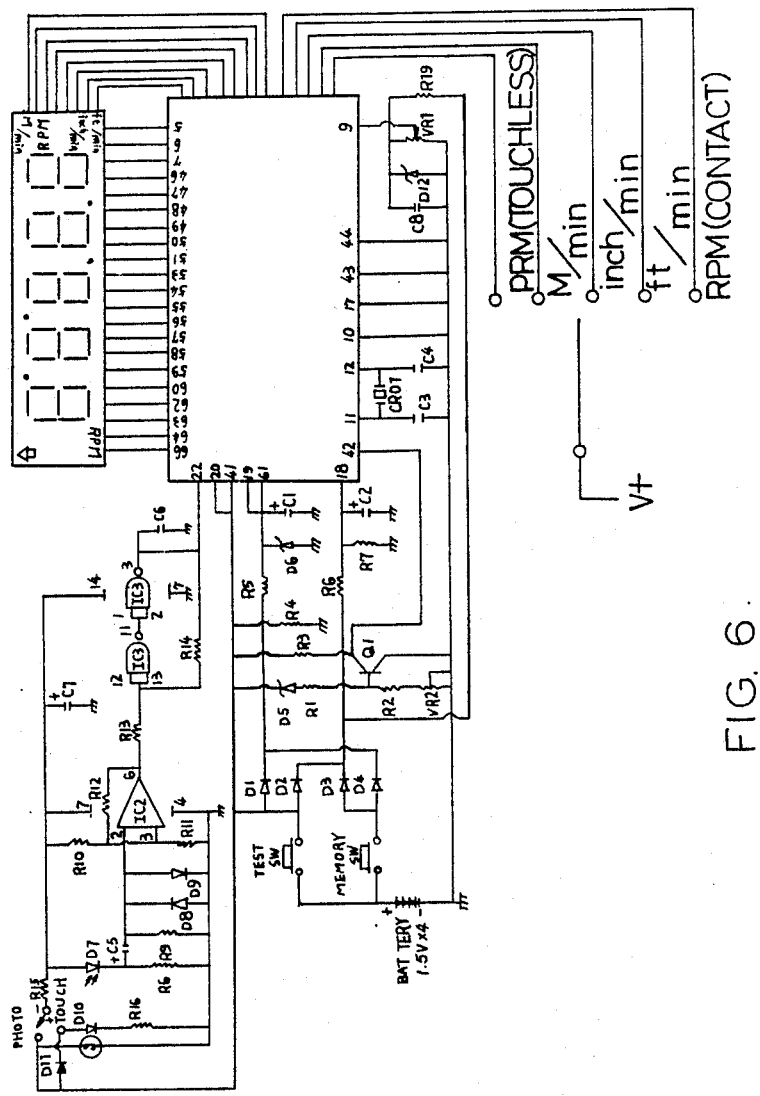
FIG. 6 is the detailed circuit diagram of this invention.

As illustrated in FIGS. 5 and 6, the contact sensor 2 comprises a disk 21 which has ten holes engraved on it to increase the resolution and provide more precise measurement.

Thus mechanical rotation of disk 21 generates a pulse signal as the holes in disk 21 allow a light beam to intermittently be received by a light sensor, providing an output similar to that generated by photosensor circuit 1.

I claim:

1. A combined touchless and contact digital tachometer for measuring and displaying a velocity value for a moving object, comprising:
   a photo emitterreceiver sensor circuit for generating a first pulse signal responsive to a reflected light signal from said object;
   a contact sensor circuit for generating a second pulse signal responsive to rotation of a perforate disk mechanically coupled to said object;
   an amplifier circuit coupled to both said photo emitter-receiver sensor circuit and said contact sensor circuit by means of a selection switch for providing an amplified pulse signal by amplifying either said first pulse signal or said second pulse signal;
   a regulator circuit coupled to said amplifier circuit for regulation and distortion compensation of said amplified pulse signal:
   a micro-processor IC circuit coupled to said regulator circuit for calculating said velocity value for said object, said micro-processor IC circuit including a storage memory, decoding logic and display driving circuitry and,
   a digital display indicator coupled to said micro-processor IC circuit whereby said decoding logic and said display driving circuitry provide means to rotate said velocity value display 180 degrees responsive to one of said sensor circuits being coupled to said amplifier circuit by said selection switch.

2. The combined touchless and contact digital tachometer as recited in claim 1 wherein said tachometer further comprises an outer casing for housing both said photo emitter-receiver sensor circuit and said contact sensor circuit on opposing ends thereof.

3. A digital tachometer system having both a touchless type tachometer sensor and a contact type tachometer sensor for alternately measuring and displaying a velocity value for a moving object, comprising:
   photo-tachometer means having a light emitter and a light receiving sensor for generating a first pulse signal responsive to a light signal reflected by said moving object from said light emitter;
   contact tachometer means for generating a second pulse signal responsive to a rate of movement of said moving object, said contact tachometer means including a rotatable perforate disk adapted for mechanically coupling to said moving object for rotation responsive to said rate of movement of said moving object; and,
   processing means coupled alternately to either said photo-tachometer means or said contact tachometer means for calculating and displaying said velocity value.

4. The digital tachometer system as recited in claim 3 wherein said processing means includes display decoding means for rotating said velocity value display 180 degrees responsive to which of said photo-tachometer means or said contact tachometer means is coupled to said processing means.

* * * * *